United States Patent [19]
Kaminow et al.

[11] 4,111,523
[45] Sep. 5, 1978

[54] THIN FILM OPTICAL WAVEGUIDE

[75] Inventors: Ivan Paul Kaminow, Tinton Falls; Herwig Werner Kogelnik, Fair Haven, both of N.J.

[73] Assignee: Bell Telephone Laboratories, Incorporated, Murray Hill, N.J.

[21] Appl. No.: 711,319

[22] Filed: Aug. 3, 1976

Related U.S. Application Data

[62] Division of Ser. No. 381,985, Jul. 23, 1973, Pat. No. 3,990,775.

[51] Int. Cl.² .............................................. G02B 5/14
[52] U.S. Cl. ................................... 350/96.14; 350/359
[58] Field of Search ...................... 350/96 WG, 160 R

[56] References Cited

U.S. PATENT DOCUMENTS

| | | | |
|---|---|---|---|
| 3,695,745 | 10/1972 | Furukawa | 350/96 WG |
| 3,795,434 | 3/1974 | Ash | 350/96 WG |
| 3,801,185 | 4/1974 | Ramaswamy et al. | 350/96 WG |
| 3,832,567 | 8/1974 | Jacques et al. | 350/96 WG |

*Primary Examiner*—John K. Corbin
*Assistant Examiner*—Stewart Levy
*Attorney, Agent, or Firm*—Lucian C. Canepa

[57] ABSTRACT

It is known to form an optical waveguiding thin film on a substrate. For various practical reasons, it is often desired that an optical beam coupled to the film be laterally confined so as to propagate only in a longitudinal stripe portion of the film. As disclosed herein, this is accomplished by depositing spaced-apart elements in contact with one surface of the film to establish in a narrow longitudinal region of the film between the elements an effective index of refraction that is higher than the index of the remainder of the film. In this way a longitudinal waveguiding stripe is formed on the film without the necessity of irradiating, etching or otherwise directly treating the film itself.

6 Claims, 4 Drawing Figures

THIN FILM OPTICAL WAVEGUIDE

CROSS REFERENCE TO RELATED APPLICATION

This application is a division of copending application Ser. No. 381,985, filed July 23, 1973, which issued on Nov. 9, 1976, as U.S. Pat. No. 3,990,775.

BACKGROUND OF THE INVENTION

This invention relates to optical signal processing and, more particularly, to a thin-film optical waveguide formed in an integrated optical structure.

Integrated optics is a recently developed technology in which thin-film techniques are applied to the fabrication of miniature compact optical devices. Due to their small size, rugged and reproducible construction, and low-cost potential, such devices are attractive candidates for inclusion in high-capacity optical communication systems.

For an overview of the field of integrated optics, see, for example, a "Survey of Integrated Optics" by S. E. Miller, *IEEE Journal of Quantum Electronics*, Vol. QE-8, No. 2, February 1972, pp. 199–205.

Techniques are known for producing a planar thin-film optical waveguiding layer on a supporting substrate material. In a planar waveguide of this type there is no optical beam spreading normal to the plane of the layer, but diffraction in the plane causes the beam to increase in width as it propagates along the film.

For some applications of practical interest, it is desired to limit the waveguiding portion of the layer to a longitudinal stripe. By so limiting the lateral extent of the optical beam, efficient modulators and other components needed to construct an optical communication system may be more easily realized. Moreover, the longitudinal stripe geometry facilitates the transfer of optical power from the thin-film structure to an associated optical fiber transmission line.

A longitudinal stripe waveguiding region may be formed in a planar film in a number of ways. For example, such a region may be formed by selectively irradiating the film through a mask. Or, by using standard photolithographic techniques, all but one or more guiding stripes of the film may be partially or completely etched away.

In some applications, the known ways of forming a waveguiding stripe in a film are satisfactory. But in others they are not, due either to degradation of the properties of the stripe arising from the stripe-formation process or to the practical difficulty of forming the stripe in a particular materials system.

SUMMARY OF THE INVENTION

An object of the present invention is an improved thin-film optical waveguide.

More specifically, an object of this invention is a longitudinal waveguiding stripe formed in a planar thin film without the necessity of irradiating, etching or otherwise directly processing the film itself.

Briefly, these and other objects of the present invention are realized in a specific illustrative embodiment thereof that comprises a metallic layer deposited on the entire top surface of the aforementioned thin film except for a longitudinal stripe region. The portion of the thin film underlying the metal-less region exhibits an effective refractive index higher than the rest of the film. Accordingly, waveguiding takes place in that portion of the film.

In a second specific illustrative embodiment of the principles of the present invention, spaced-apart metallic layers are deposited directly on the top surface of a substrate. A waveguiding film is then deposited on the substrate in the spacing between the layers as well as on top of the layers themselves. The effect of the layers is to confine waveguiding to a limited region of the film.

BRIEF DESCRIPTION OF THE DRAWING

A complete understanding of the present invention and of the above and other objects thereof may be gained from a consideration of the following detailed description presented hereinbelow in connection with the accompanying drawing in which.

DETAILED DESCRIPTION

Figure 1:
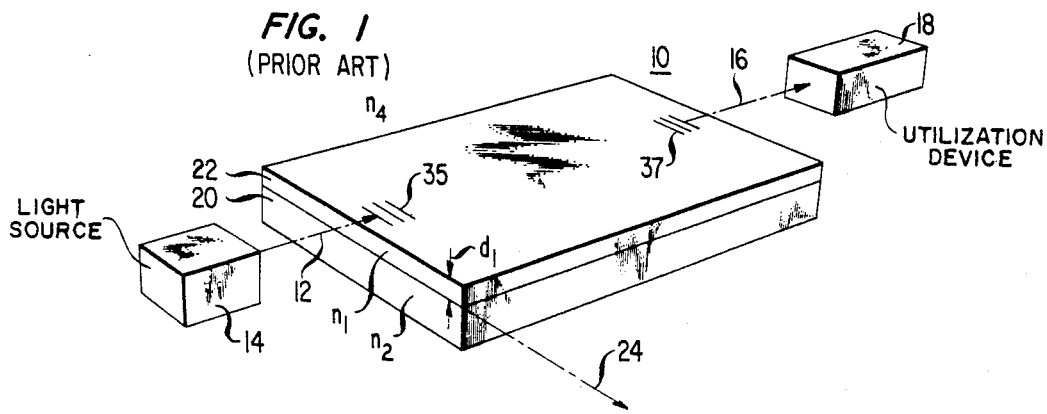
FIG. 1 shows a prior art thin-film optical waveguide.

FIG. 1 is a pictorial illustration of a prior art integrated-optics device 10. The device 10 is positioned in the path of incident radiation (represented by dashed line 12) supplied by a light source 14. The radiation is typically coherent with wavelength(s) in the optical range (which includes visible and near-visible wavelengths) and may be provided by any suitable source, for example a laser. Any portion of the incident beam that is transmitted through the device 10 is directed along an output path (indicated by dashed line 16) to impinge upon a utilization device 18 that comprises, for example, a conventional photodetector. In some applications of practical interest an optical fiber may be utilized to directly couple the devices 10 and 18.

The prior art device 10 of FIG. 1 includes a substrate 20 on which a thin film 22 of an electro-optic dielectric material is deposited. It is known that for the film 22 to support propagating optical modes and to act as a waveguide for light waves, the refractive index $n_1$ of the film 22 must be greater than the index $n_2$ of the substrate 20. Both of the indices are assumed to be greater than the refractive index $n_4$ of the air space above the device 10. If desired, a suitable covering layer (not shown) having an index of refraction less than that of the guiding film 22 may be deposited on the device to protect its upper surfaces and/or to provide a symmetrical guiding structure. The substrate 20 may, for example, be made of glass, with a suitable waveguiding layer or stripe of electro-optic material deposited on the substrate. But for purposes of a specific example herein it will be assumed that the substrate is instead made of $LiNbO_3$ which is an electro-optic material. Illustratively, the substrate is oriented such that the c axis of the $LiNbO_3$ crystal is parallel to vector 24 shown in FIG. 1.

For a $LiNbO_3$ substrate, an optical waveguiding layer may be formed thereon by out-diffusion. The selective out-diffusion of $Li_2O$ in a substrate of $LiTaO_3$ or $LiNbO_3$ to form a surface guiding layer is disclosed in a commonly assigned application, namely, J. R. Carruthers-I. P. Kaminow application Ser. No. 324,884, filed Jan. 18, 1973, now U.S. Pat. No. 3,837,827, issued Sept. 24, 1974. Alternatively, a waveguiding layer may be formed on the substrate 20 by epitaxially depositing a higher-index layer thereon.

Illustratively, the film 22 has a thickness $d_1$ approximating the wavelength of the radiation to be propagated therein, so that the radiation is effectively confined in the thickness dimension by the dielectric discontinuities provided by the major surfaces of the film, that is, the substrate-to-film and air space-to-film interfaces. For the purposes of this invention the thickness of the film may be anywhere within the range of 0.1 to 100 times the wavelength to be propagated as measured in the waveguide, but is preferably between 1 and 10 times the wavelength.

In such a planar waveguiding structure, there is no beam spreading normal to the plane but diffraction of the beam in the plane will occur. To limit such diffraction, formation of a higher-index layer may be restricted to a longitudinal-stripe surface region of the substrate. Or, after forming a higher-index layer 22 on the entire top surface of the substrate 20, all or part of that layer except a narrow stripe may be selectively removed by etching or ion milling or other techniques. In these ways, waveguiding action may be limited to a stripe in the device 10. But, as indicated earlier above, these known ways of limiting the lateral extent of the waveguiding portion of the layer 22 are sometimes not satisfactory.

Radiation supplied by the source 14 may be introduced into and extracted from the film 22 of the device 10 in any one of a variety of ways known in the art. For example, prism couplers of the type described in *Applied Physics Letters,* Vol. 14, page 291 (1969), may be utilized for that purpose. Advantageously, in applications in which miniaturization, ruggedness and simplicity are important, optical coupling and decoupling are accomplished by means of optical diffraction gratings formed directly on the surface of the guiding film 22 so as to be structurally integral therewith. Such couplers, which are, for example, described in A. Ashkin-E. P. Ippen U.S. Pat. No. 3,674,335, issued July 4, 1972, can be constructed to exhibit coupling efficiencies of better than 70 percent.

For illustrative purposes, gratings 35 and 37, each depicted as a series of parallel lines, are respectively utilized in the prior art FIG. 1 device to couple optical waves into and out of the waveguiding film 22.

Figure 2:
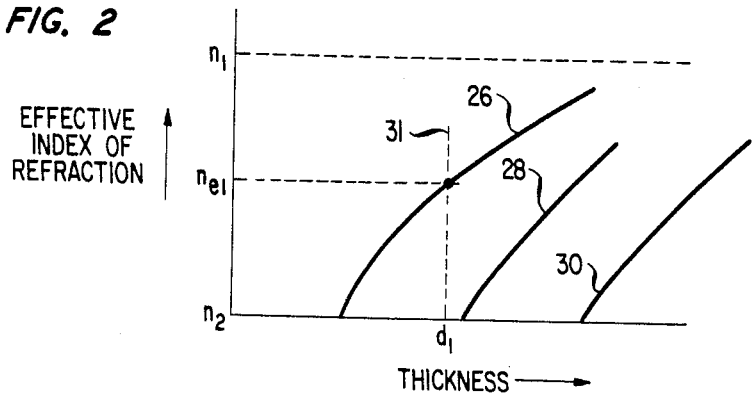
FIG. 2 is a graph associated with the FIG. 1 structure.

FIG. 2 is a plot of the effective index of refraction "seen" by an optical wave in the course of propagating through the device 10 versus the thickness of the waveguiding layer 22 of FIG. 1. Curve 26 designates the fundamental TE mode capable of being transmitted through the device 10, and curves 28 and 30 are representative of higher-order modes. For a particular selected thickness, the corresponding effective index or indices are determined by the intersection between the depicted curve(s) and a vertical line at the selected thickness. For the thickness $d_1$ only a single such intersection occurs (determined by line 31 and curve 26). In other words, only the fundamental mode propagates in the layer 22 and no higher-order modes are supported thereby. For that case the effective index of refraction of the depicted structure is $n_{e1}$.

Figure 3:
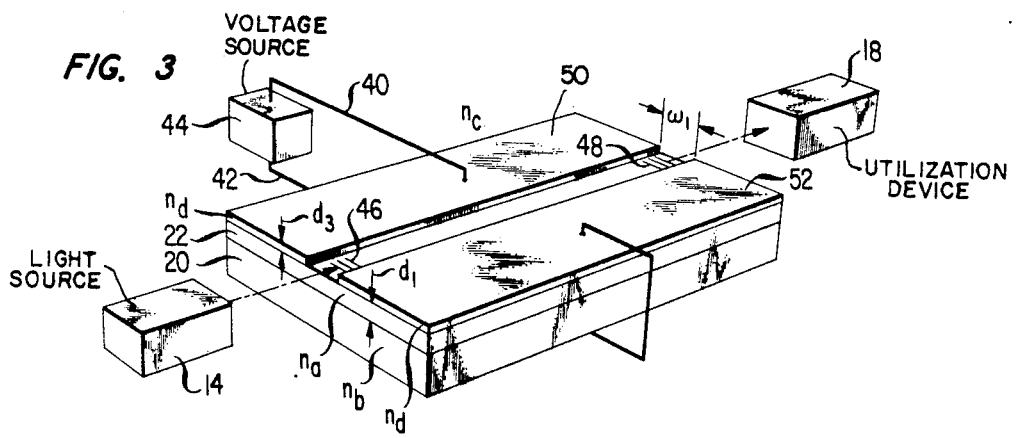
FIGS. 3 and 4 each depict a specific illustrative embodiment made in accordance with the principles of the present invention.

A specific illustrative embodiment made in accordance with the principles of the present invention is depicted in FIG. 3. The substrate and planar waveguiding layer of the FIG. 3 structure may, for example, be identical to the corresponding elements previously described above. Accordingly, the same reference numerals 20 and 22, respectively, are employed therefor in FIG. 3.

Deposited on the top surface of the layer 22 of FIG. 3 are two layers 50 and 52. The layers 50 and 52, which illustratively are each made of the same material (whose nature is specified below), serve to define therebetween an uncoated region of the layer 22 within which waveguiding action is to be confined. In practice, the width $w_1$ of the uncoated region between the layers 50 and 52 approximates 1 to 100 micrometers. The thickness $d_3$ of the layers 50 and 52 is not critical. This thickness may, for example, be about 0.1 to 1 micrometer.

The material of the layers 50 and 52 of FIG. 3 is selected to be one whose index of refraction $n_d$ is a complex number. More specifically, $n_d^2$ is of the form $$A + iB$$

where $A$ is a negative real number. Many metals exhibit such a complex refractive index at visible wavelengths. Alternatively, the layers 50 and 52 may be made of a semiconductive or dielectric material which at the wavelength(s) being propagated in the depicted structure is at or near an electronic or lattice resonance. In that region such materials also exhibit a complex refractive index of the required form.

In accordance with one aspect of the present invention, the respective refractive indices $n_a$ and $n_b$ of the layers 22 and 20, the refractive index $n_c$ of the ambient medium, and the refractive index $n_d$ of the layers 50 and 52 are selected to satisfy the following relationships:

$$n_a^2 > n_b^2, n_a^2 > n_c^2, n_a^2 > A, \text{ and } n_c^2 > A.$$

(The stripe guiding effect will be greater, the larger the ratio $n_a/n_b$.)

For a particular illustrative case in which the substrate 20 and the layer 22 of FIG. 3 are both lithium niobate and in which the ambient medium is air, the layers 50 and 52 may, for example, be made of aluminum or silver thereby to satisfy the above-specified relationships.

Alternatively, the substrate 20 may be made of glass, the layer 22 may be a plastic polymer such as a suitable photoresist, and the layers 50 and 52 may be made of silver.

The effect of the aforementioned layers 50 and 52 is to cause those portions of the layer 22 directly thereunder to exhibit a lower effective refractive index than that in the uncovered portion of the layer 22. Accordingly, waveguiding is confined to the uncovered portion of the layer 22. In particular, waveguiding takes place in a narrow longitudinal stripe region of the layer 22. As indicated in FIG. 3, this waveguiding stripe has a width $w_1$ and a thickness $d_1$.

An advantage of the FIG. 3 structure is that in those embodiments thereof wherein the layers 50 and 52 are conductive and the layer 22 is an electro-optic material, no additional elements need be added thereto to form, for example, a modulator. The overlying layers 50 and 52 themselves serve as longitudinally extending electrodes by means of which a variable electric field may be established in the waveguiding portion of the layer 22. In FIG. 3, leads 40 and 42 respectively connect the spaced-apart electrodes 50 and 52 to a variable voltage source 44.

By selectively depositing surface layers of the type shown in FIG. 3, straight or curved waveguiding channels may in effect be formed in the underlying layer 22. In this way, the fabrication in integrated-optics form of channel dropping filters, directional-coupler-type hybrids, switches and other devices is facilitated.

Figure 4:
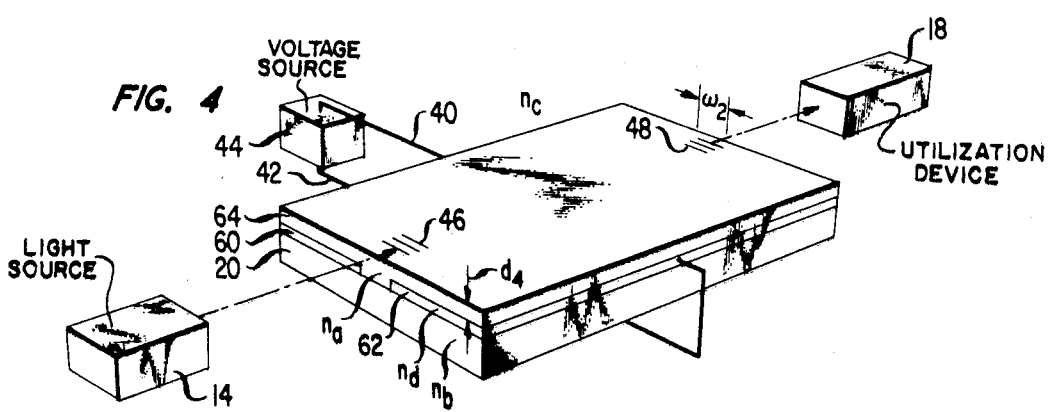

Alternatively, as depicted in FIG. 4, layers 60 and 62 having the aforespecified refractive index $n_d$ may be first deposited directly on the substrate 20. In that case a waveguiding film 64 having a refractive index $n_a$ is deposited on the substrate 20 between the layers 60 and 62 as well as on top of the layers 60 and 62. As before, if the indicated relationships among the specified refractive indices are satisfied, the effect of the layers 60 and 62 is to confine waveguiding to a limited region of the film 64. In particular, waveguiding occurs in the film 64 in a region thereof having a width $w_2$ and a thickness $d_4$. As seen in FIG. 4, this waveguiding region lies directly above the gap between the layers 60 and 62. Illustratively, the thickness of the $n_d$ layers 60 and 62 is much less than the thickness of the guiding layer 64.

It is to be understood that the various above-described arrangements are only illustrative of the application of the principles of the present invention. In accordance with these principles, numerous other low-loss easily fabricated arrangements may be devised by those skilled in the art without departing from the spirit and scope of the invention. For example, the pairs of layers 50, 52 and 60, 62 respectively shown in FIGS. 3 and 4 may be combined in a single structure in which a waveguiding thin film is sandwiched between deposited pairs of such layers.

What is claimed is:

1. In combination, a substrate, a planar dielectric thin-film waveguiding layer disposed on said substrate, said waveguiding layer having an index of refraction that is greater than the index of refraction of said substrate, and passive means for defining in said layer in the absence of an applied electric field a region having an effective index of refraction that is higher than that in the other regions of said layer, said passive means comprising only two spaced-apart longitudinal elements disposed in contact with one surface of said layer for defining in the portion of said layer between said elements a portion to which optical waveguiding is limited, said elements each having a complex index of refraction $n_d$ where $$n_d^2 = A + iB,$$

$A$ being a negative real number, $i = \sqrt{-1}$ and $B$ being a real number.

2. A combination as in claim 1 where an ambient medium surrounds said combination and where the index of refraction $n_a$ of said layer, the index of refraction $n_c$ of said medium and $n_d$ are related as follows:

$$n_a^2 > A, n_c^2 > A.$$

3. A combination as in claim 2 wherein said layer comprises an electro-optic material and said elements are made of a conductive material, and further including means connected to said elements for establishing a variable electric field in said layer portion to which waveguiding is limited.

4. An integrated optical structure comprising a substrate, two spaced-apart films on said substrate, said films each having a complex index of refraction $n_d$ where $$n_d^2 = A + iB,$$

$A$ being a negative real number, $i = \sqrt{-1}$ and $B$ being a real number, and an optical waveguiding thin layer disposed in the space between said films and on top of said films whereby optical signals coupled to said layer for propagation through said structure are confined in lateral extent to a region in said layer directly above the spacing between said films, said waveguiding layer having an index of refraction that is greater than the index of refraction of said substrate.

5. A structure as in claim 4 further including means for coupling an optical beam to one end of said region, and means for extracting an optical beam from the other end of said region.

6. A structure as in claim 5 wherein said layer comprises an electro-optic material and said films are made of a conductive material, and further including means connected to said films for establishing an electric field in the region of said waveguiding layer to which optical signal propagation is confined.

* * * * *